United States Patent [19]

Burton et al.

[11] Patent Number: 4,459,727

[45] Date of Patent: Jul. 17, 1984

[54] MACHINE FOR FABRICATING DRIVESHAFTS

[76] Inventors: Robert Burton, N. 87 W. 17044 Rosslyn Ave., Menominee Falls, Wis. 53051; Glenn Parma, 1104 Biemert St., Green Bay, Wis. 54304

[21] Appl. No.: 316,499

[22] Filed: Oct. 29, 1981

[51] Int. Cl.³ .............................................. B23P 19/04
[52] U.S. Cl. ....................................... 29/238; 29/281.1; 29/281.4; 29/237; 269/43; 269/156; 269/296
[58] Field of Search ........................ 269/25, 37, 43, 55, 269/63, 156, 296; 228/49 R, 49 B, 44.1 R, 44.5, 6 R; 29/252, 281.4, 281.1, 237, 238; 82/28 R, 30

[56] References Cited

U.S. PATENT DOCUMENTS

| | | | |
|---|---|---|---|
| 1,586,139 | 5/1926 | Bivins | 269/156 X |
| 1,713,678 | 5/1929 | Seibert | 269/289 MR X |
| 2,059,753 | 11/1936 | Scott et al. | 269/69 X |
| 2,753,826 | 7/1956 | Dougherty | 228/6 R |
| 3,758,098 | 9/1973 | Vrilakas | 269/55 |

*Primary Examiner*—Frederick R. Schmidt
*Assistant Examiner*—Steven P. Schad
*Attorney, Agent, or Firm*—Dennis J. Verhaagh

[57] ABSTRACT

A machine for fabricating driveshafts includes a frame including a support bed. A tailstock with centering spindle is mounted on said support bed. A headstock with driving spindle coincident with said centering spindle's axis is also mounted on said support bed. A rotatably lockable phasing plate is receivable in said driving spindle for mounting a rotary workpiece coincident with said axis. A phasing plate lockable in a positional relationship to said driving spindle phasing plate is receivable in said centering spindle for mounting a rotary workpiece coincident with said axis.

6 Claims, 10 Drawing Figures

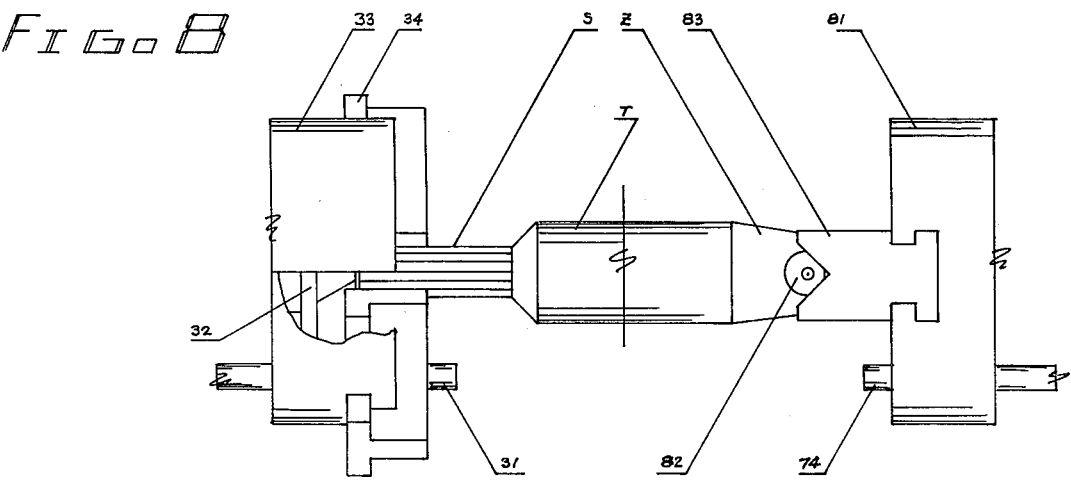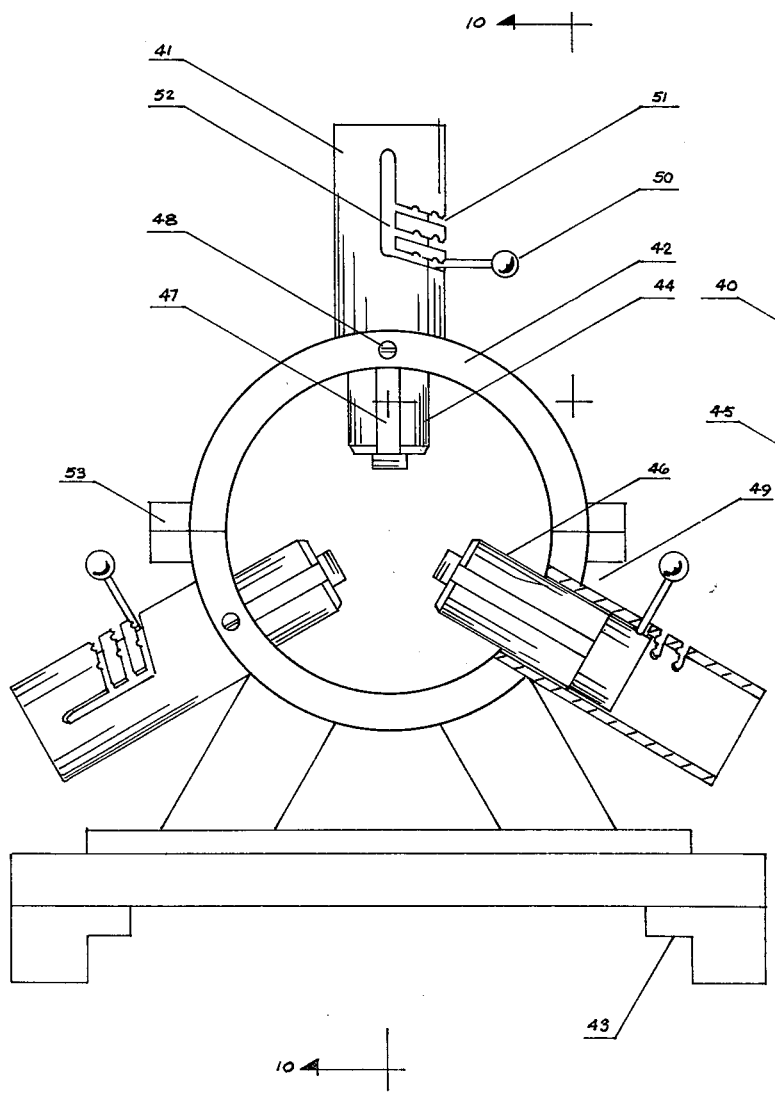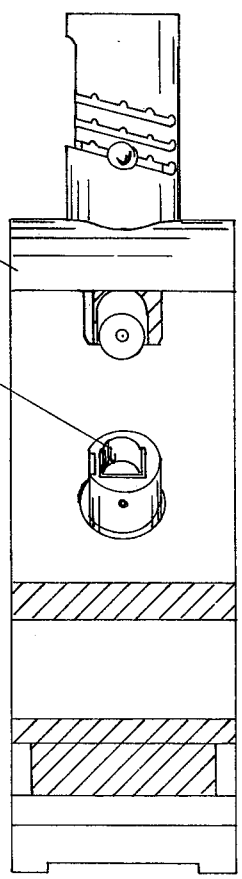

MACHINE FOR FABRICATING DRIVESHAFTS

FIELD OF THE INVENTION

The field of art to which this invention pertains is Metal Working and Work Holders and, in particular, means to assemble driveshafts.

DESCRIPTION OF THE PRIOR ART

The general state of the prior art appears to be well-described in the U.S. Patents to Dougherty, No. 2,753,826 and Vrilakas, No. 3,758,098.

SUMMARY OF THE INVENTION

The purpose of the invention is to provide a new and improved machine to fabricate driveshafts composed of a tubular middle section and rotary end components. The machine also provides means for machining operations such as pressing, welding, cooling, straightening and balancing said assembly. The driveshaft assembly referred to is that type used primarily for driveshafts in motor vehicles. The tubular portion is usually manufactured from steel tubing of various outside diameters between $1\frac{1}{4}''$ to $6\frac{1}{2}''$ (3.175 cm to 15.8 cm) depending upon the application. The end components, usually end yokes or spline plugs, are welded to the tube section after accurately aligning their axes to be coincident with that of the tubes to eliminate eccentricities in the assembly. Furthermore, the nature of the workpiece requires that the machine has means to put the end component of the workpiece in time or "in phase." Hooke's coupling, also known as the Cardan Joint, is the most common form of universal joint. This joint cannot tolerate any parallel misalignment. The shaft must be straight. Also, in order to transmit power through angles greater than 15 degrees without torsional vibration, it is necessary to use two such couplings and an intermediate driveshaft arranged so that any vibration between the input and intermediary shafts is cancelled by an equal and opposite vibration between the intermediate and output shafts. To function correctly, the forks at the ends of the intermediate shaft must be parallel. Any variance from parallel will result in torsional vibration. To accomplish this, the machine provides face plates machined with workpiece receiving spaces to accept such forks and other end components and means to lock said face plates in position to insure the assembled driveshaft will be in phase before assembly.

The nature of the invention is the use of a machine for holding driveshaft components in a fixed position about the spindle axes of the machine and also between centers for performing machining operations such as phasing, pressing, welding, cooling, straightening and balancing.

BRIEF DESCRIPTION OF THE DRAWINGS

FIG. 8 is a partial section side view of a shorten workpiece locked in phase between phasing plates of the invention shown in FIGS. 4 and 6 showing use of the mounting pin of FIG. 7.

FIG. 9 is an end view of a steadyrest of the invention with a sectioned view showing a roller assembly of said steadyrest.

FIG. 10 is a side view of a steadyrest of the invention along line 10—10 of FIG. 9.

DETAILED DESCRIPTION OF THE INVENTION

Figure 1:
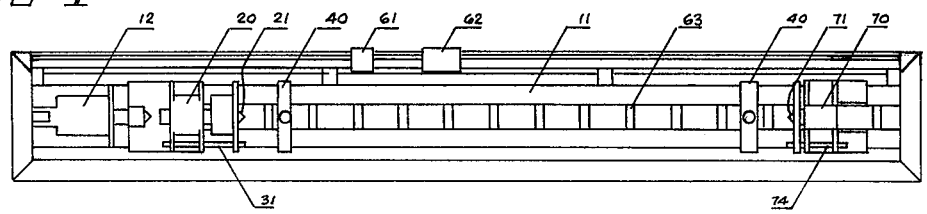
FIG. 1 is a top view of the invention.
Figure 2:
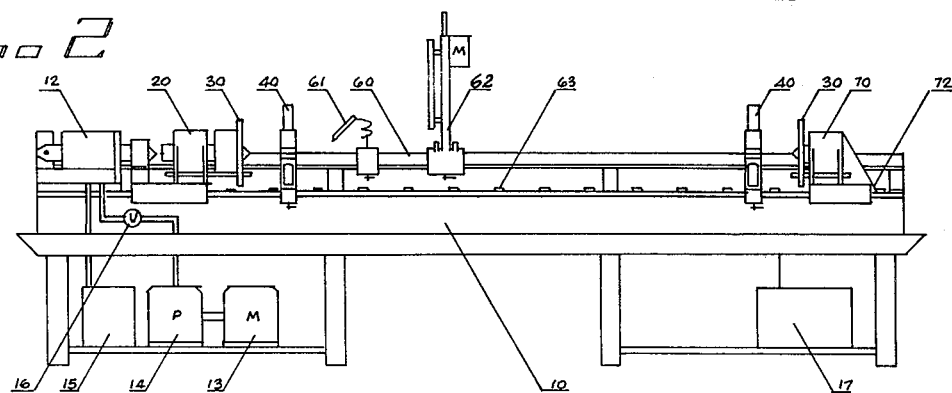
FIG. 2 is a side view of the invention.

The basic parts of the machine are shown in FIGS. 1 and 2. A machine frame 10 includes a support bed 11. Fixedly mounted on the bed is a hydraulic ram 12. Slidably mounted on the bed immediately forward of the ram is the headstock 20 of the machine with driving spindle 21. The ram is in-line with the axis of the driving spindle which is coincident to the machine bed and above said bed. Mounted to the driving spindle is a face plate 30 machined to accomodate various rotary driveshaft end components Z for pressably mounting to a driveshaft tube T all coincident with the axis of the driving spindle. Slidably mounted to the headstock is a pin 31 for locking the face plate in position by means of a pin engageable hole machined therein when an end component is mounted in the plate "in phase" with another end component mounted in the tailstock spindle 71. Driveshaft manufacturers standardize the respective orientation of the end components on a driveshaft for reasons of ease in phasing, installation, maintenance and other factors. Slidably mounted on the bed between the headstock and tailstock are two steadyrests 40 with positionable roller assemblies to accomodate various driveshaft tube outside diameters. The steadyrests establish the centerline of a driveshaft tube mounted therein to be coincident with the centerline established by the driving spindle 21 of the headstock and the centering spindle 71 of the tailstock. Parallel to the machine bed and on the opposite side of the machine from the operator's station is mounted a rail 60 the length of the machine. Slidably mounted to the rail are welding 61 and balancing 62 mechanisms. Mounted between the ways of the machine bed are stops 63 set at even increments for positively locking the position of the tailstock on the machine bed. Mounted at the end of the machine bed is the tailstock 70 with its centering spindle 71. A locking lug 72 formed in the tailstock is provided to lock in the stops 63 of the machine bed. The tailstock also accomodates a phasing plate 30 for rotatably mounting a rotary driveshaft end component coincident with the axis of the centering spindle and a phasing pin 74 for holding an end component mounted in the tailstock phasing plate in phase with an end component mounted in the headstock phasing plate. Mounted below the machine bed is a motor 13 to drive the pump 14 for the hydraulic ram. A reservoir 15 for hydraulic fluid is provided to complete the ram circuit which consists of reservoir, pump, operator's valve 16 and ram. A coolant storage tank 17 and hosing is also provided for cooling and straightening the welded assembly.

Figure 3:
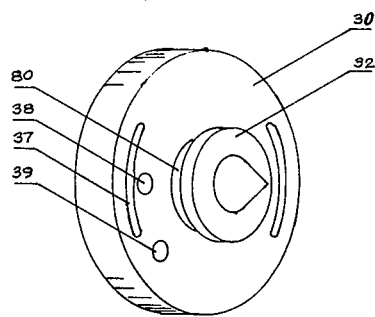
FIG. 3 is a perspective view of a phasing plate of the invention with removable live center.
Figure 4:
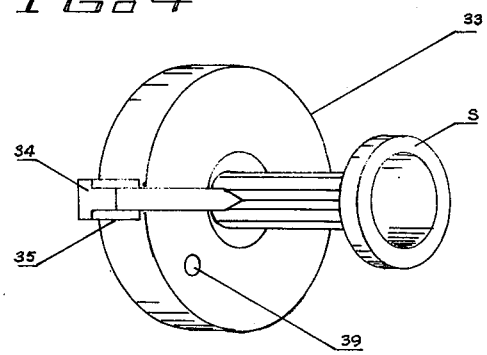
FIG. 4 is a perspective view of a phasing plate of the invention showing the mounting of a splined driveshaft end component.
Figure 5:
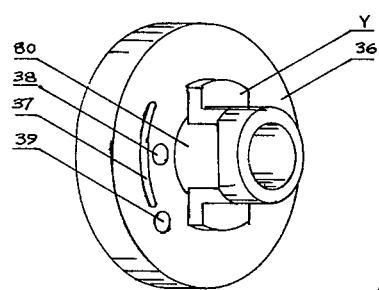
FIG. 5 is a perspective view of a phasing plate of the invention showing the mounting of one style of driveshaft end component.
Figure 6:
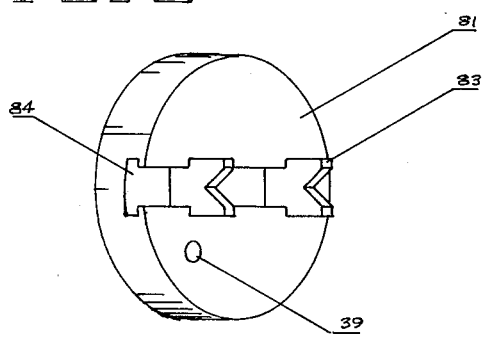
FIG. 6 is a perspective view of a phasing plate of the invention for mounting of another style of driveshaft end component.
Figure 7:
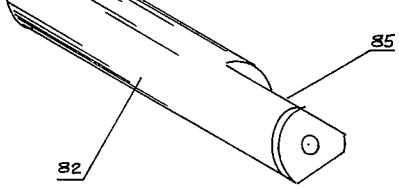
FIG. 7 is a perspective view of a notched mounting pin for use with the phasing plate shown in FIG. 6.

FIGS. 3 through 6 are face plates 30 to accomodate various driveshaft end components. FIG. 3 shows a face plate that accomodates a live center 32. Such a plate is used for balancing a completed assembly on centers. FIG. 4 is a face plate 33 for holding and phasing a splined end component S. It is essentially a lockable two-jawed chuck in that two jaws 34 slidable in a T-slot 35 machined diametrically on a face plate clamp the spline component and center it coincident with the spindle centerline. One phasing plate may be machined to accomodate several applications as is shown in FIG. 5 which shows a phasing plate machined with recesses 37 and alignment holes 38 to accomodate two different size end yokes of the same configuration Y. Also, the machined surfaces of the plates of FIGS. 3 and 5 may be combined in one plate. The plate of FIG. 5 is bored 80 to fit a live center 32 as well as machined to fit end yokes. Note the phasing pin holes 39 in all the plates. FIG. 6 shows another phasing plate 81 machined to accomodate a yoke end component of a different configuration Z which has holes to hold a universal joint. The pin of FIG. 7 is fitted to this end component and the V-jaws 83 slidable in the diametrically machined T-slot 84 of the phasing plate center the component to the tube by means of the conforming pin surfaces 85. FIG. 8 shows a workpiece assembly mounted for phasing between headstock and tailstock phasing plates. Some manufacturers provide that a splined end component is in phase with a yoke end component bored for mounting a universal joint when a spline tooth is up and a pin through the yoke bore is horizontal. FIG. 8 shows the slidably keyed jaws 34 of the spline phasing plate locking the spline end of a driveshaft assembly in position with a tooth up. The yoke end is held in V-jaws of its phasing plate in a position with the pin of FIG. 7 at right angles to the locked spline tooth.

As shown in FIGS. 9 and 10, the steadyrests 40 are slidable on the machine bed. Because they carry the driveshaft tube during pressing operations, the roller bearings 45 are locked to axial movement of the supported tube rather than circumferential movement as is usual in steadyrests used for machining long stock in a lathe. The steadyrests preferably have three roller assemblies per steadyrest for three-point contact each mounted 120 degrees apart, one vertically, around a circular annular ring 42 which is operable 53 to load the tube section. The ring is mounted to a frame 43 machined to be slidably adjustable upon the machine bed. The roller assemblies 46 are radially positionable and slidable in the steadyrest tubes to accomodate various driveshaft tube diameters. The setting is a lockable one to insure positive maintenance of the centerline during pressing operations. It has been found that without the lockable steadyrests, the accuracy of the assembly is greatly reduced. As shown, the steadyrests are preferrably comprised of a base 43 machined to be mountable on the machine bed with two retractable rollers 45 positionable to various tube outside diameters and a top section hingedly 53 mounted to said base member and containing a third adjustable roller having the same said settings. The positions are selected by settings 51 machined into the three lock tubes 41 at 30 degree increments. By machining 3 rows of settings on a common channel 52 of the lock tubes, sufficient predetermined settings are available to accomodate most tube sizes used in the industry though more rows can be added. The setting handle 50 of the steadyrest is joined to the rotating cylinder 49 of the roller assembly which in turn is joined to the non-rotating member 44 which is slotted 47 to permit radial movement but locked 48 to prevent rotating motion in order that the tube can be press fit while supported in the steadyrest.

In operation, the phasing plates are selected and mounted to the spindles and locked in place with phasing pins. Then, the tops of the steadyrests are unhinged and the roller assemblies of the steadyrests are preset to the tube outside diameter. The tubular section of the assembly is then placed on the rollers. The steadyrests are then closed and locked in place thus setting the centerline of the tube to the centerline of the driving and centering spindles. The tube section is then moved forward in the steadyrests to the end component mounted on the driving spindle phasing plate. The tailstock with the other end component is moved forward to the nearest stop on the machine bed before the end of the tube section. The components are then press fit into the tube by means of the hydraulic ram which pushes the driving spindle and mounted component towards the centering spindle and attached component while the axes of said spindles are coincidental and they are locked in positional alignment with respect to each other or, in other words, "in phase". The steadyrest rollers and phasing pins are disengaged allowing the assembly to rotate on the centers. The assembly may then be gaged for tolerance, welded, cooled, straightened and balanced in place by means of the overhead drive.

What is claimed is:
1. A machine for fabricating driveshafts comprising:
   a. a frame including a support bed;
   b. a tailstock mounted on said support bed;
   c. means for mounting said tailstock on said support bed;
   d. a centering spindle mounted on said tailstock having an axis;
   e. a headstock;
   f. means for mounting said headstock on said support bed;
   g. a driving spindle mounted on said headstock coincident with said centering axis;
   h. a driving spindle phasing plate receivable in said driving spindle for mounting a first rotary workpiece coincident with said axis, means for locking the rotation of said driving spindle phasing plate;
   i. a tailstock phasing plate receivable in said centering spindle for mounting a second rotary workpiece coincident with said axis, means for locking the rotation of said tailstock phasing plate in a specific positional relationship to said driving spindle phasing plate;
   j. means on said frame for pushing said driving spindle along said axis toward said centering spindle whereby the first and second rotary workpieces are joined in a particular angular relationship with respect to each other.
2. The machine of claim 1 further comprising support means mounted to said bed for positioning the axis of a rotary workpiece coincident to the axis of the driving and centering spindles.
3. The machine of claim 1 wherein said tailstock mounting means is a lockably mounting one of incrementally spaced stops in the support bed.
4. The machine of claim 1 wherein said driving spindle and tailstock phasing plate locking means comprise slidable pins engageable in holes in said phrasing plate, tailstock and headstock.

5. The machine of claim 1 further including rotary workpiece positioning means mounted to said bed which comprises:
   a. a frame mountable on said machine bed;
   b. a ring vertically affixed to said frame with a rotary workpiece receiving space within said ring;
   c. radially positionable and slidable bearing locking means spaced equally around the annulus of said ring and lockable to a setting equal to the outside diameter of a rotary workpiece positioned on the bearing surfaces therein.

6. The machine of claim 1 wherein said workpiece mounting means are workpiece receiving spaces on the opposing phasing plates of the headstock and tailstock which, when the phasing plates are locked in position, are in phase for a driveshaft mounted therein.

* * * * *